United States Patent [19]
Ray et al.

[11] Patent Number: 6,009,225
[45] Date of Patent: Dec. 28, 1999

[54] FIBER OPTIC DROP SPLICE CLOSURE AND RELATED METHODS

[76] Inventors: Craig D. Ray, 1801 Tarbert Dr.; Jim Aberson, 110 Charlemagne Ct., both of Cary, N.C. 27511

[21] Appl. No.: 09/084,182

[22] Filed: May 26, 1998

[51] Int. Cl.⁶ .............................. G02B 6/00; G02B 6/36
[52] U.S. Cl. ........................................................... 385/135
[58] Field of Search ..................................... 385/135–147

[56] References Cited

U.S. PATENT DOCUMENTS

| | | | |
|---|---|---|---|
| 4,927,227 | 5/1990 | Bensel, III et al. | 350/96.2 |
| 5,071,211 | 12/1991 | Debortoli et al. | 385/76 |
| 5,155,794 | 10/1992 | Nolf et al. | 385/135 |
| 5,167,001 | 11/1992 | Debortoli et al. | 385/135 |
| 5,185,845 | 2/1993 | Jones | 385/135 |
| 5,278,933 | 1/1994 | Husinger et al. | 385/135 |
| 5,323,478 | 6/1994 | Milanowski et al. | 385/135 |
| 5,323,480 | 6/1994 | Mullaney et al. | 385/134 |
| 5,353,366 | 10/1994 | Bossard | 385/134 |
| 5,375,185 | 12/1994 | Hermsen et al. | 385/135 |
| 5,457,763 | 10/1995 | Kerry et al. | 385/135 |
| 5,509,099 | 4/1996 | Hermsen et al. | 385/134 |
| 5,515,472 | 5/1996 | Mullaney et al. | 385/136 |
| 5,553,186 | 9/1996 | Allen | 385/135 |
| 5,590,234 | 12/1996 | Pulido | 385/135 |
| 5,596,670 | 1/1997 | Debortoli et al. | 385/135 |
| 5,617,501 | 4/1997 | Miller et al. | 385/134 |
| 5,619,608 | 4/1997 | Foss et al. | 385/135 |
| 5,631,993 | 5/1997 | Cloud et al. | 385/135 |
| 5,689,605 | 11/1997 | Cobb et al. | 385/135 |
| 5,717,811 | 2/1998 | Macken | 385/135 |

*Primary Examiner*—Akm E. Ullah
*Attorney, Agent, or Firm*—Herbert G. Burkard

[57] ABSTRACT

A fiber optic splice closure includes at least one first splice organizer tray having one end pivotally connected to a base and extending in a medial portion of a housing; a mounting member pivotally connected to the base adjacent the at least one first splice organizer tray; and at least one second splice organizer tray pivotally connected to the mounting member on a side thereof opposite the at least one first splice organizer tray. The splice closure also preferably includes a slack storage tray connected to the base and positioned in the housing adjacent a side of the at least one first splice tray that is opposite the mounting member. The splice closure thus provides a compact, yet flexible, closure facilitating drops to a fiber optic ring network. The at least one first splice organizer tray is preferably pivotal about a first axis, and the at least one second splice organizer tray is also preferably pivotal about a second axis generally parallel to the first axis. In addition, the housing may have a generally cylindrical shape defining a longitudinal axis generally transverse to the first and second axes. The mounting member is preferably pivotal about a third axis parallel to the first and second axes. At least one optical fiber may be preinstalled between first and second splice trays.

50 Claims, 7 Drawing Sheets

FIBER OPTIC DROP SPLICE CLOSURE AND RELATED METHODS

FIELD OF THE INVENTION

The present invention is related to fiber optics, and, more particularly, to a fiber optic splice closure and associated methods, as may be used for ring cable network configurations.

BACKGROUND OF THE INVENTION

Fiber optic cables and their associated electronics are widely used for providing telephony, data and other related communications services. A fiber optic communication system typically offers immunity to electrical noise, a relatively large information carrying bandwidth, and low signal losses. The fiber optic cables are readily installed in existing city duct lines, on overhead pole lines, or direct buried in the earth to thereby form cable networks including a plurality of users.

One particularly advantageous use of fiber optic technology is for a ring or loop in a metropolitan or city setting. Unfortunately, one potential disadvantage of an optical fiber cable, as compared to radio, for example, is that an inadvertent cable cut will disrupt communication over the cut cable. Accordingly, it is common to provide a cable network for a metropolitan area, for example, in the form of a ring, and to provide redundant electronics coupled to the cable ring.

The cable ring and electronics provide two possible paths of communication. If the cable is cut in the first path, then communications is directed in the opposite direction over the second path of the cable ring. The cut fiber cable may then be repaired and full service restored.

Such a fiber optic network or system is commonly used in a downtown or metropolitan environment where individual fibers originate at a telephone company or service provider central office and are dropped at various office buildings or other large communications users along the ring. Typically the cable of the ring has a relatively large fiber count, such as, for example, from 96 to 144 fibers. A typical user may only use two fibers from the ring—one for transmit and one for receive. In addition, the electronics can typically switch directions, such as in the event of a cable cut.

A user is typically connected to the ring at a drop point using two separate splice closures. The main closure is connected to adjacent legs of the main or ring cable. A majority of the individual optical fibers may be spliced directly between the two adjacent legs. Alternately, a majority of the non-dropped fibers may be directly passed through without splicing.

In addition, a pair of relatively low count fiber optic drop cables are spliced at their first ends to predetermined ones of the fibers from the ring cable in the main closure. The low fiber count drop cables may be about 60 feet in length and connect to a drop closure. Drop fibers are connected to the ends of the two drop cables, and fibers which are not dropped are spliced together in the drop closure. The dropped fibers are connected to electronic equipment, and some fibers may be set aside as spares for future use. The main splice closure, the drop cables, and the drop splice closure are typically grouped together in a manhole or vault and consume a relatively large amount of space. In addition to the cost and space required, the large number of splices and the lack of flexibility to add additional drops are significant disadvantages of this conventional approach.

Of course the prior art discloses many different versions of splice closures. One typical configuration includes pivoting generally elongate and rectangular splice organizer trays positioned to extend longitudinally within a splice enclosure. For example, U.S. Pat. No. 5,515,472 to Mullaney et al., and assigned to the assignee of the present invention, discloses such a splice closure. The closure also includes a bottom slack storage tray portion for storing buffer tubes.

U.S. Pat. No. 5,155,794 to Nolf et al., and also assigned to the assignee of the present invention; U.S. Pat. No. 5,185,845 to Jones; U.S. Pat. No. 4,927,227 to Bensel, III et al.; U.S. Pat. No. 5,553,186 to Allen; U.S. Pat. No. 5,590,234 to Pulido; and U.S. Pat. No. 5,617,501 to Miller et al. also each disclose generally rectangular, pivotally connected splice trays within an overall housing. U.S. Pat. No. 5,619,608 to Foss et al. discloses a plurality of elliptical trays arranged in a stack at a common angle to an axis of the stack. U.S. Pat. No. 5,717,811 to Macken, also assigned to the present assignee, discloses a series of splice organizer trays having rounded outer ends and which are arranged in a stack at an inclined angle. This patent is directed to an organizer that is able to handle both live fiber, and dark fiber—a dark fiber end being a free end of the fiber that is being stored for possible future use. The patent further discloses that a module of trays may be preinstalled with fibers.

Unfortunately, despite the continued improvements and developments in the area of splice closures, at present the multiple closure and drop cable configuration is most commonly used for the drop locations along a ring network. As already mentioned above, the use of main and drop splices consumes considerable space, is labor intensive, and may not be sufficiently flexible for the subscriber or end user should additions or changes be needed.

SUMMARY OF THE INVENTION

In view of the foregoing background, it is therefore an object of the present invention to provide a splice closure combining the features of a main splice closure, drop cables and drop splice closure together to thereby reduce the cost and space required, such as for a drop location from a ring network.

It is another object of the present invention to provide such a splice closure with features to provide enhanced flexibility for adding drops and/or changing the configuration of the network.

These and other objects, features and advantages in accordance with the present invention are provided by a splice closure comprising at least one first splice organizer tray having one end pivotally connected to a base and extending in a medial portion of a housing; a mounting member pivotally connected to the base adjacent the at least one first splice organizer tray; and at least one second splice organizer tray pivotally connected to the mounting member on a side thereof opposite the at least one first splice organizer tray. Each of the types of splice organizer trays preferably includes fiber optic splice supporting portions. The splice closure also preferably includes a slack storage tray connected to the base and positioned in the housing adjacent a side of the at least one first splice tray that is opposite the mounting member. The splice closure thus provides a compact, yet flexible, closure facilitating drops to a fiber optic ring network.

The at least one first splice organizer tray is preferably pivotal about a first axis, and the at least one second splice organizer tray is also preferably pivotal about a second axis generally parallel to the first axis. In addition, the housing may have a generally cylindrical shape defining a longitudinal axis generally transverse to the first and second axes. The mounting member is preferably pivotal about a third axis also parallel to the first and second axes.

In one preferred embodiment, the at least one second splice organizer tray comprises a plurality of trays connected to the mounting member in side-by-side relation. Optical fiber loops preferably extend from the at least one first splice organizer tray to the second splice organizer trays to facilitate connecting to the fiber optic cable ring. Of course, transport tubes may be used to protect and carry the optical fiber loops which may be preinstalled in the splice closure according to a significant aspect of the invention.

The second splice organizer trays may have a generally rounded free end portion opposite the mounting member. The fiber optic splice supporting portion may be positioned adjacent the generally rounded free end portion of the at least one second splice organizer tray. Moreover, the second splice organizer trays each preferably include fiber guide means for guiding at least one optical fiber. In one advantageous embodiment, the second splice organizer tray comprises a hinge portion opposite the free end portion and pivotally connected to the mounting member, and the fiber guide means defines respective first and second optical fiber ports on opposite sides of the hinge portion.

Another important aspect of the splice closure, and, in particular, of the second splice organizer trays is the provision of a crossing guide member for guiding at least one optical fiber loop in a configuration to both enter and exit a predetermined port. This permits all of the loop fibers from the cable ring to enter the second trays from a first side, and permits drop connections to the loops from the opposite side of the second trays.

Yet another aspect of the invention is that at least one third splice organizer tray may be pivotally connected to the mounting member to facilitate splicing for random access to at least one optical fiber. The third tray preferably has a same configuration as the second trays, but provides yet another desired feature.

The housing may have a generally cylindrical shape. Accordingly, the free or outer ends of the second splice organizer trays are rounded to correspond to the housing and provide a greater splicing density. In addition, the slack storage tray may also have sloping or angled sidewall portions to conform to adjacent portions of the cylindrical housing.

A mounting bracket is preferably carried by the base to support the slack storage tray, and to pivotally support the at least one first splice organizer tray, and the mounting member. The base may also include a plurality of cable ports therein for receiving respective fiber optic cables.

A method aspect of the invention is for making a fiber optic cable network of a type comprising a fiber optic cable routed in a ring configuration, and a plurality of drop locations along the fiber optic cable route. The method preferably comprises the steps of: providing a respective fiber optic splice closure as described above, at each of the drop locations; and splicing the at least one optical fiber from the ring to the at least one optical fiber at the at least one first splice organizer tray. The method may also include the step of splicing at least one optical fiber from a drop cable to the at least one optical fiber loop on the at least one second splice organizer tray.

Each fiber optic splice closure may further comprise a slack storage tray connected to the base and positioned in the housing adjacent a side of the at least one first splice tray opposite the mounting member. Accordingly, the method may further include the step of storing slack fiber passing through the splice closure in the slack storage tray.

Another advantageous method feature of the invention permits connection to any of the fibers in the ring. More particularly, the method may include the steps of providing at least one third splice organizer tray on the mounting member, and connecting at least one predetermined optical fiber to the ring using the at least one third splice organizer tray.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
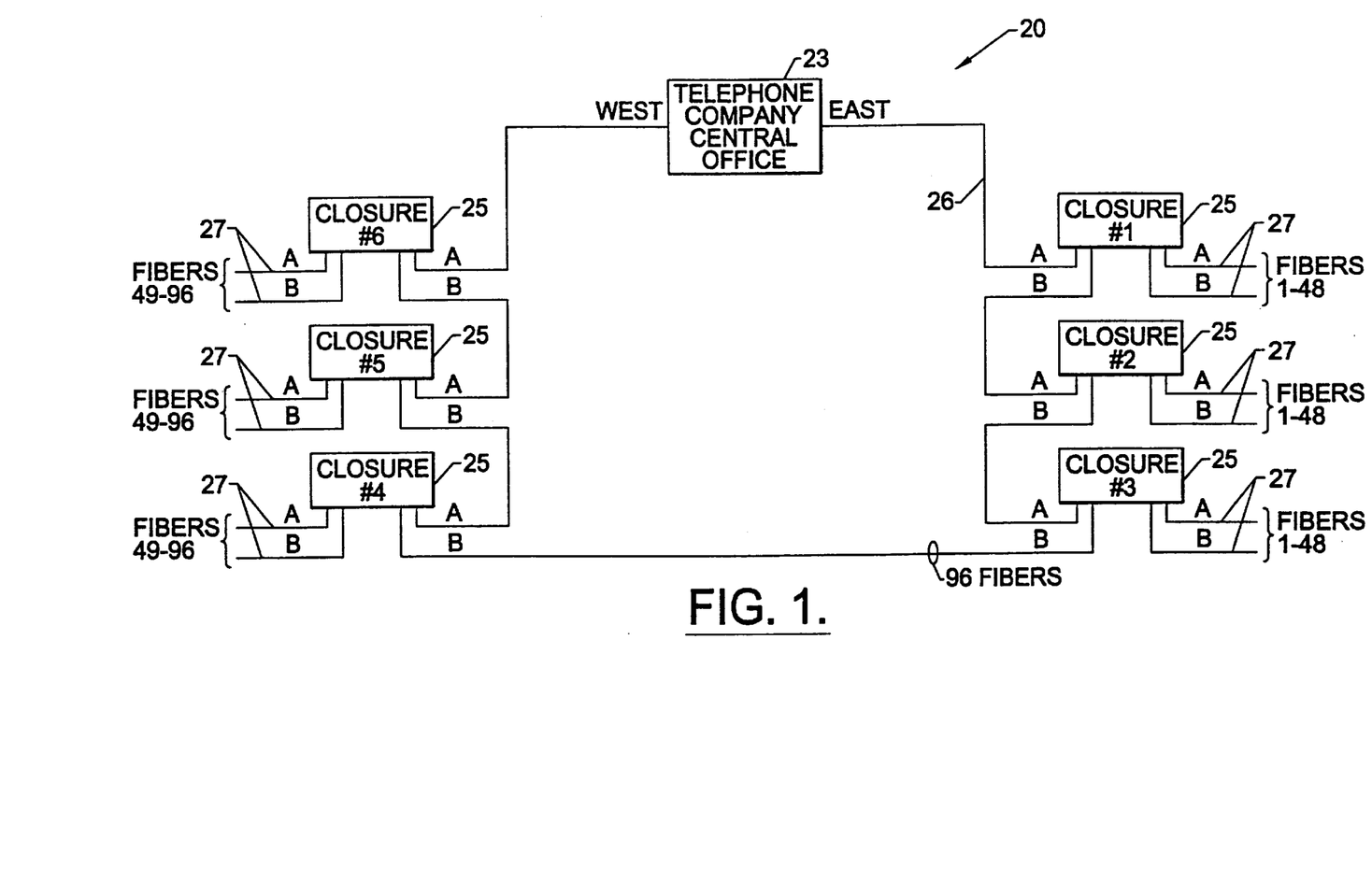
FIG. 1 is a schematic diagram of a fiber optic ring network including the fiber optic splice closure in accordance with the present invention.

Referring now initially to FIG. 1 the splice closure 25 and an example of a fiber optic network 20 advantageously incorporating such a closure in accordance with the invention are first described. The network 20 illustratively includes a 96-fiber cable 26 which extends in a ring configuration in East and West directions from a telephone company central office 23, as will be readily appreciated by those skilled in the art. As will also be readily appreciated by those skilled in the art, a plurality of drop locations are positioned along the cable route, such as for various relatively large users or subscribers. At each drop location, a splice closure 25 is positioned and connected to the main fiber optic cable 26. In addition, a pair of drop cables 27 are also connected to the splice closure as will be described in greater detail below. The cables 26, 27 are designated A and B to indicate their direction around the ring as will also be readily appreciated by those skilled in the art. A single drop cable may also be used, but may provide less reliability than the two drop cable configuration.

Figure 2:
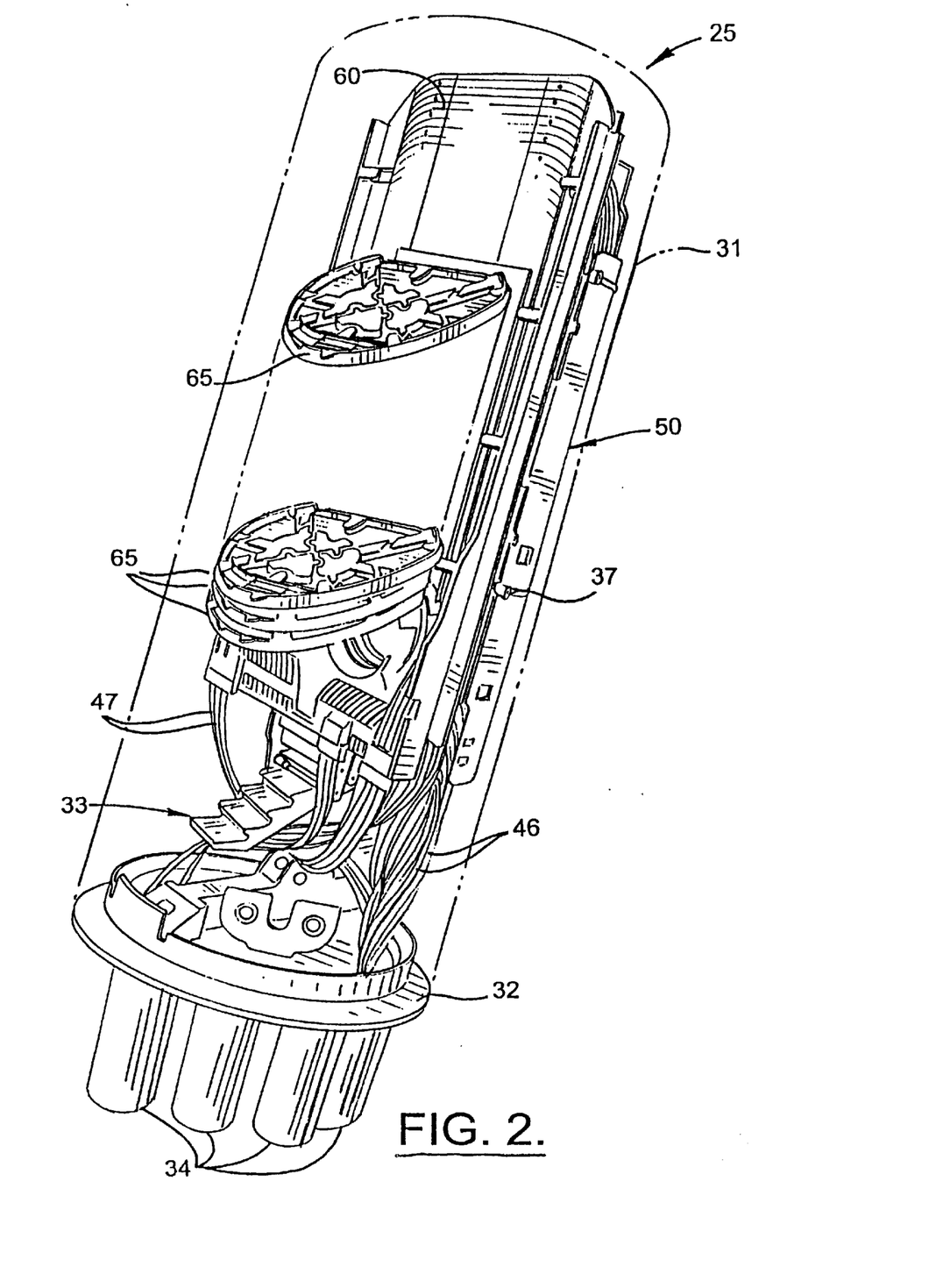
FIG. 2 is a perspective view of the splice closure according to the invention with the housing shown in dotted outline form, and with only several of the drop or second splice organizer trays in the series shown in detail, the others being schematically represented by the dashed line.
Figure 3:
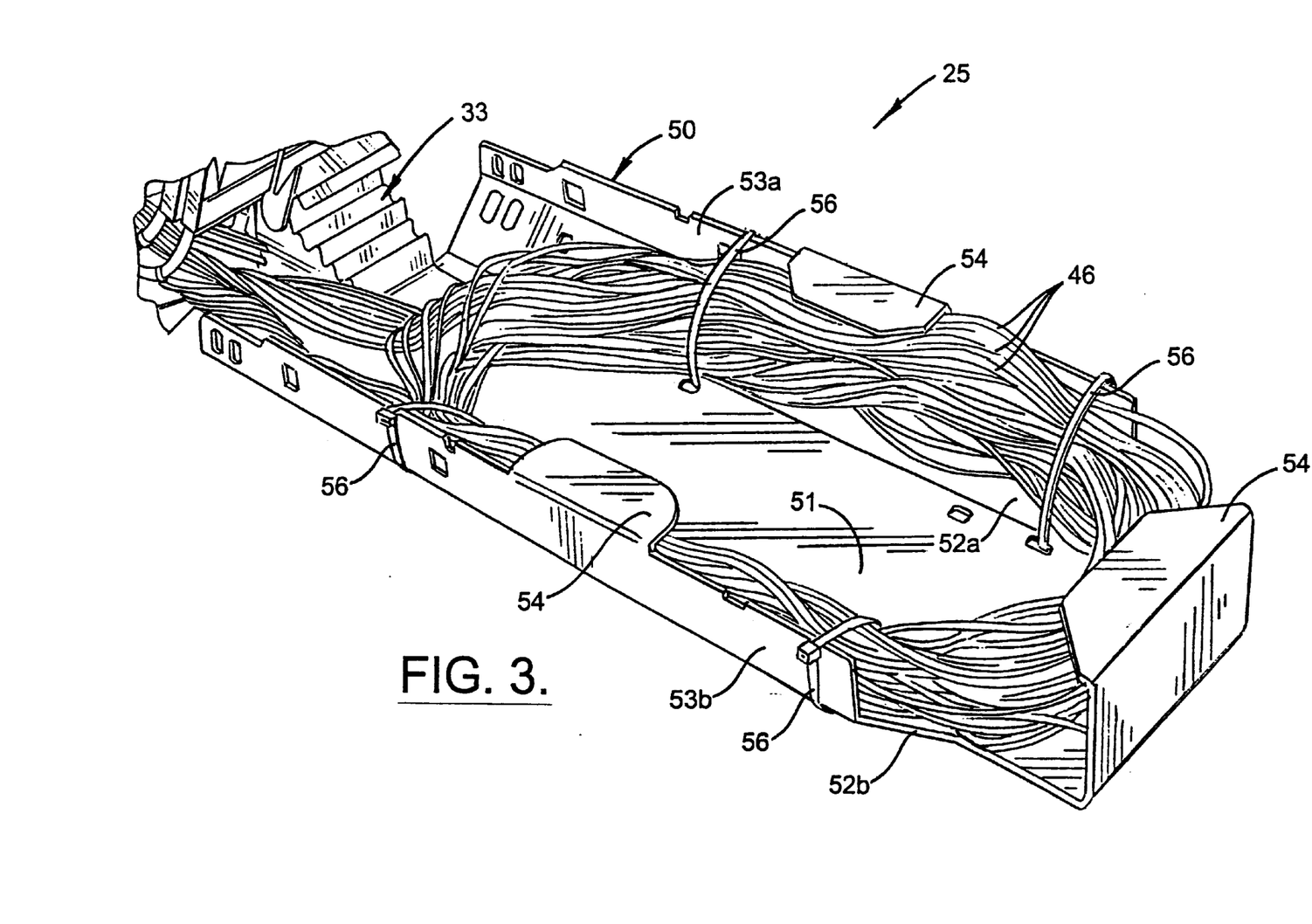
FIG. 3 is a perspective view of the slack storage tray of the closure as shown in FIG. 2.
Figure 4:
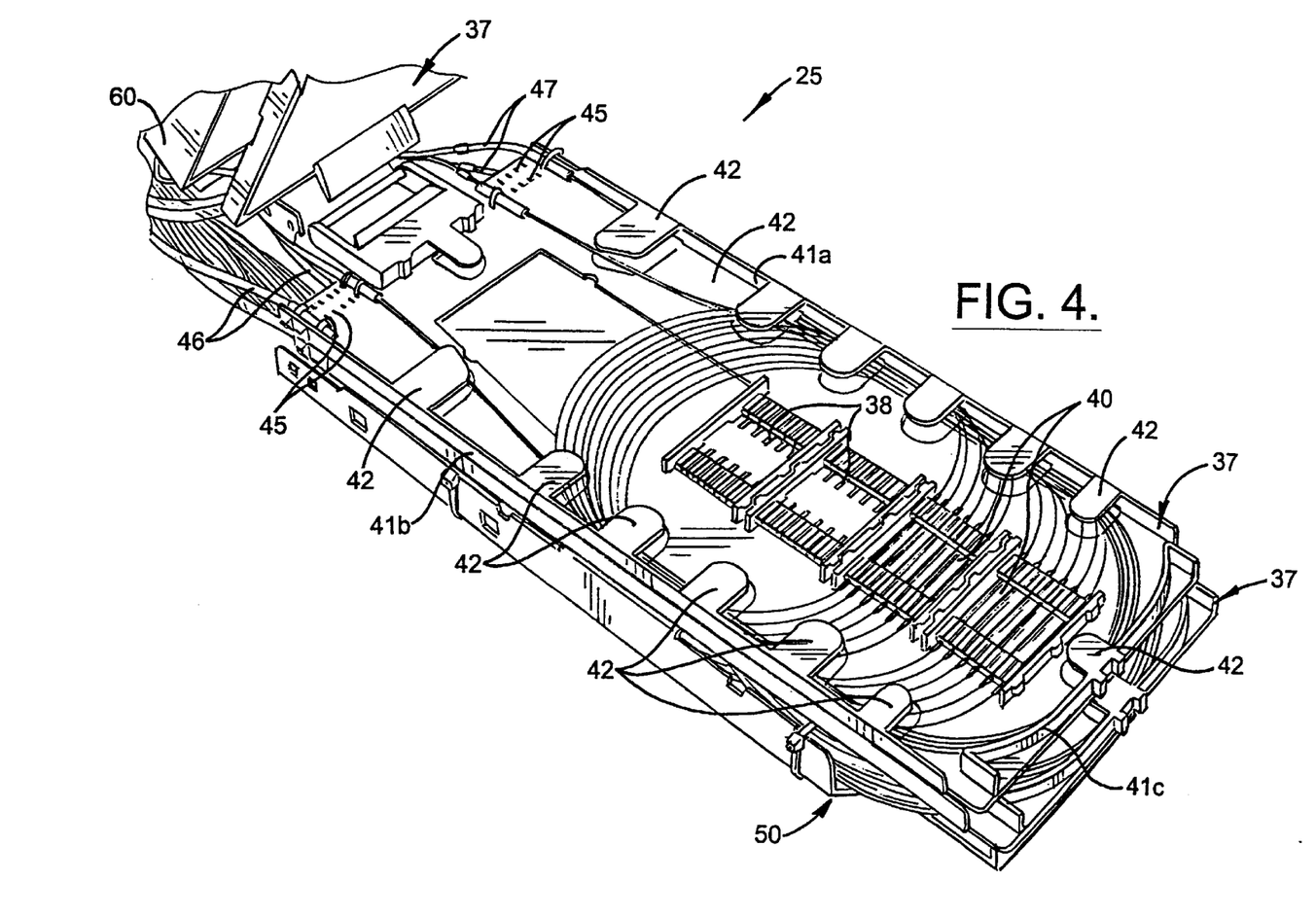
FIG. 4 is a perspective view of the slack storage tray and main or first fiber splice organizer trays of the splice closure as shown in FIG. 2.

Referring now additionally to FIGS. 2–4, the main components of the splice closure 25 are explained. The splice closure 25 includes a generally cylindrical housing 31 indicated in phantom lines in FIG. 2, and a base 32 connected thereto. The housing 31 and base 32 may be formed of conventional rugged plastic materials as will be readily appreciated by those skilled in the art. A mounting bracket, generally designated at 33, is connected to the base 32. A plurality of cable ports 34 extend outwardly from the base 33 to receive respective fiber optic cables as will also be readily appreciated by those skilled in the art.

The splice closure 25 includes at least one first or main cable splice organizer tray 37 (FIG. 4) having one end pivotally connected to the base 32 via the bracket 33. In the illustrated embodiment, the splice closure 25 includes three such first splice organizer trays 37. Typical configurations may range from one to three, although those of skill in the art will appreciate that more than three may also be provided for high fiber count cables, for example. The number of first splice trays 37, if decreased, could allow for a larger slack storage tray 50, for example. The first organizer trays 37 are generally rectangular and elongate, and the trays are positioned to extend in a medial portion of a housing. The first organizer trays 37 are pivotally connected at one end to the bracket 33.

The first organizer tray 37 includes a splice support portion 38 for holding or supporting optical fiber splices 40 as will be readily appreciated by those skilled in the art. For a typical configuration, thirty six fibers could be handled by one first splice organizer tray 37. In addition, the first splice trays 37 include a planar base 42, opposing sidewalls 41a, 41b extending upwardly from the base, and a proximal end including openings 45 to facilitate securing buffer tubes 46 and transport tubes 47. The term "buffer tubes" refers to the buffer tubes in a typical loose-buffer tube fiber cable, and the term "transport tubes" refers to the protective tubes positioned over the individual one or more fibers for routing between trays as will be further described below.

The first organizer tray 37 also includes a distal end wall 41c and a series of inwardly extending tabs 42 positioned in spaced apart relation on the sidewalls 41a, 41b. The planar base, wall portions, and tabs define guide means for routing the optical fibers on the tray without exceeding a minimum bend radius for the fibers as will be readily appreciated by those skilled in the art. The first splice organizer trays 37 are pivotally connected to the bracket 33 in a stair-step arrangement to permit access to underlying trays as will also be readily appreciated by those skilled in the art.

The splice closure 25 also includes a slack storage tray 50 (FIG. 3) connected to the base 32 and positioned in the housing 31 adjacent an underside of first splice trays 37. The slack storage tray 50 may be used to store buffer tubes 46 that are not accessed at the drop location, for example. The slack tray or basket 50 includes a planar base 51, a first pair of opposing sidewall portions 52a, 52b extending at outwardly diverging angles from the base, and an upper pair of generally parallel sidewall portions 53a, 53b connected to the diverging sidewall portions. Inwardly extending tabs 54 are provided to help retain the buffer tubes 46 in the tray. A distal end wall portion 52c is also illustratively provided and connected to the base 51. Plastic tie wraps 56 are illustratively used to secure the slack buffer tubes 46 in position.

The splice closure 25 also includes a mounting member 60 pivotally connected to the base 32 via the bracket 33, and overlying the uppermost first splice organizer tray 37. The mounting member 60 in the illustrated embodiment is in the form of a generally rectangular planar member adapted to carry the illustrated plurality of second splice organizer trays 65. The mounting member 60 may also include portions for routing and securing buffer/transport tubes, as well as individual fibers. More particular, the second or drop splice organizers 65 include a pair of hinge pins 66 (FIG. 5) which cooperate with mating recesses in the mounting member 60 to pivotally mount the second trays. Accordingly, the second splice organizer trays 65 may also be pivoted to permit access to a particular tray as will be readily understood by those skilled in the art.

As also shown in the illustrated embodiment (FIG. 2) the second splice trays define respective first pivot axes that are parallel to the second pivot axes of the first splice trays 37. The first and second axes are transverse to the longitudinal axis defined by the cylindrical housing 31. Of course, the mounting member 60 also has a pivot axis transverse to the longitudinal axis of the housing 31, and parallel to the first and second axes of the first and second splice organizer trays.

The second or drop splice trays 65 are pivotally connected to the mounting member 60 on a side thereof opposite the first splice organizer trays 37. The second splice trays 65 are arranged in side-by-side relation. The number of such slice trays 65 may be as few as one to as many as twenty-four, for example, as will be appreciated by those skilled in the art. Greater numbers could also be accommodated. The splice closure 25 thus provides a compact, yet flexible, closure facilitating drops to a fiber optic ring network 20 as shown in FIG. 1. A relatively high density of splices can be accommodated and with partitioning to greatly increase ease of installation and later reconfiguration flexibility.

Figure 5:
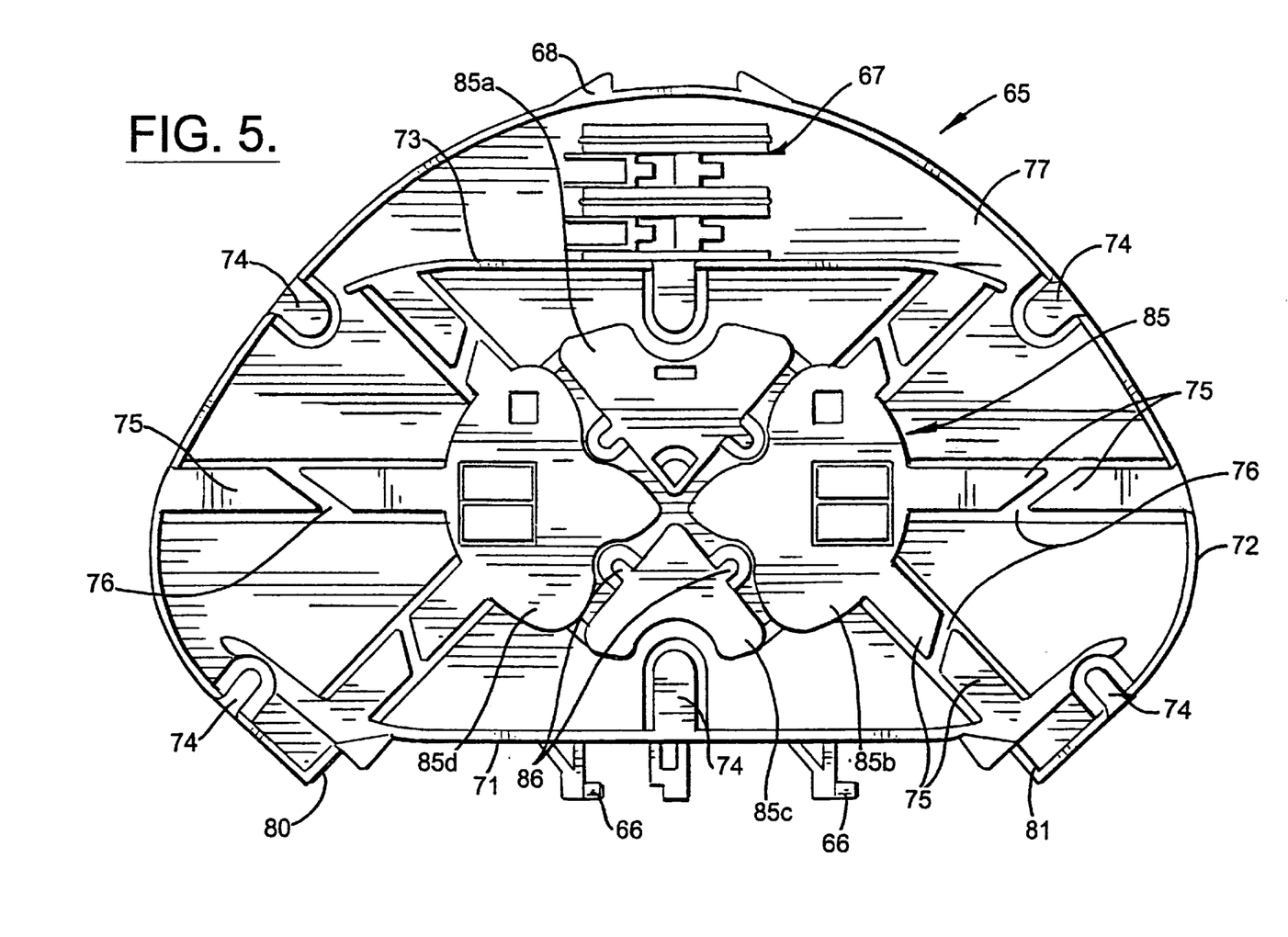
FIG. 5 is a greatly enlarged plan view of a second splice organizer tray used in the splice closure as shown in FIG. 2.
Figure 6:
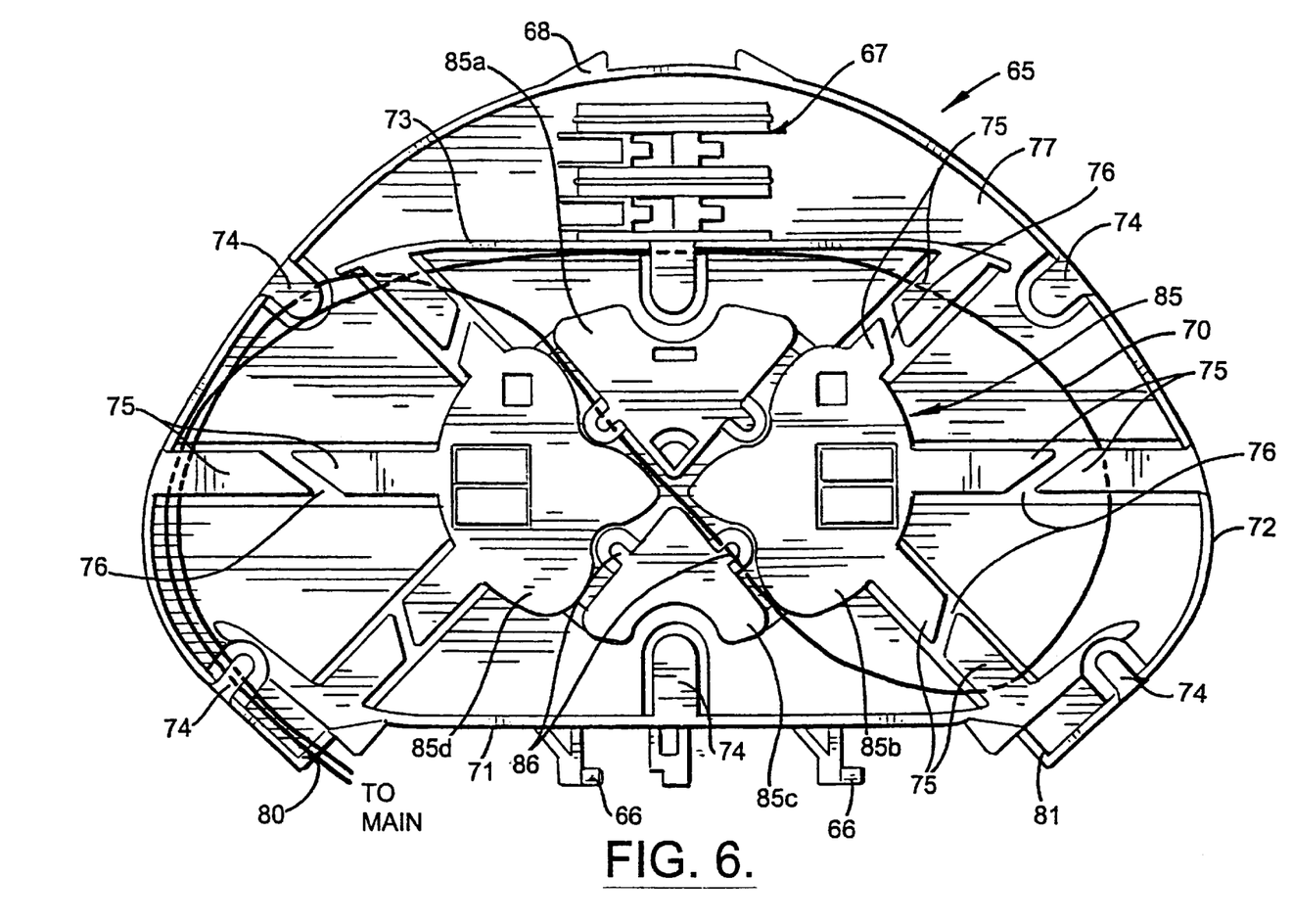
FIG. 6 is the plan view of the second splice organizer tray as shown in FIG. 5 with one fiber loop shown routed therein.
Figure 7:
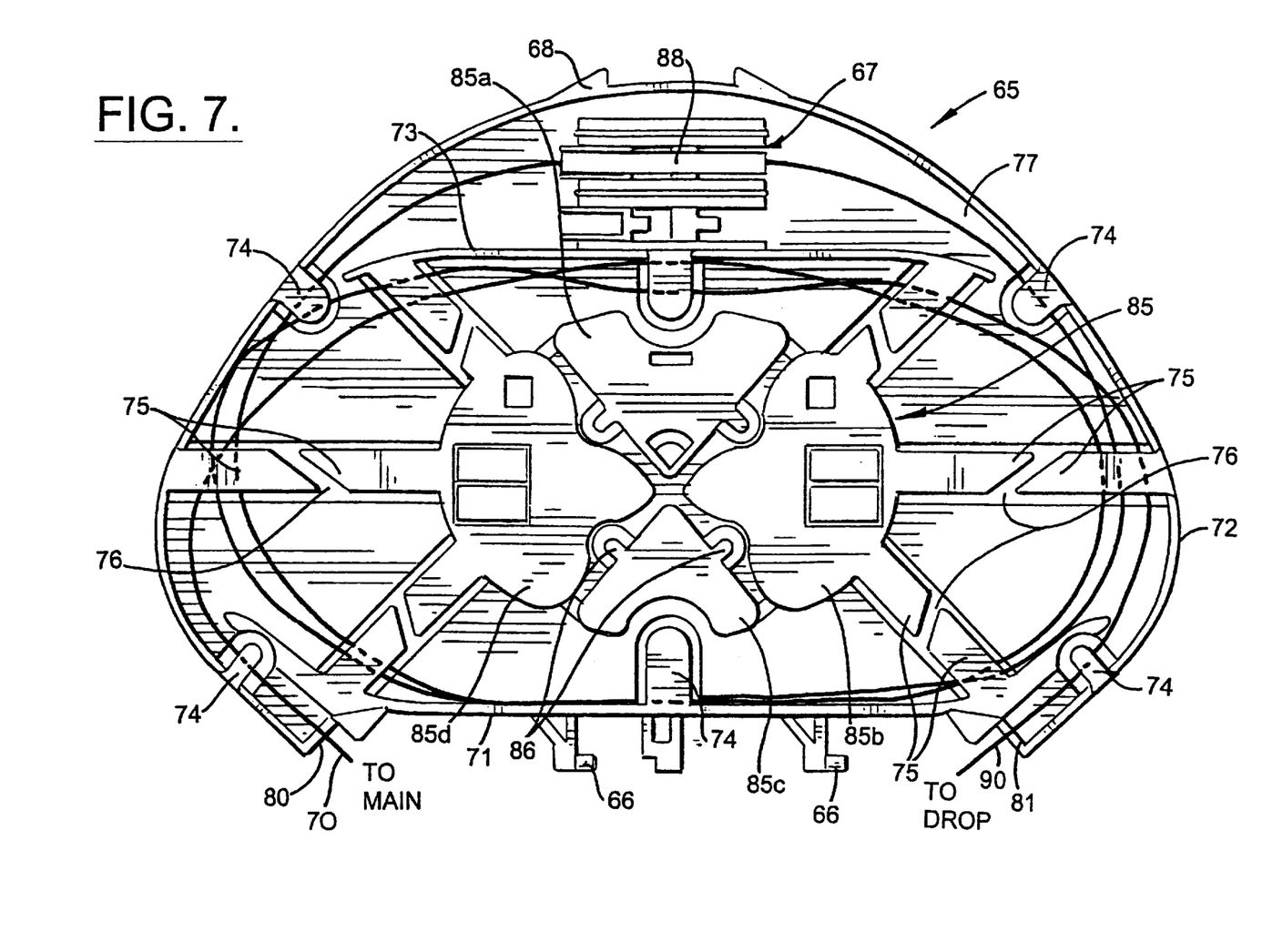
FIG. 7 is the plan view of the second splice organizer tray as shown in FIG. 5 with a drop splice shown therein.

Turning now to FIGS. 5–7, other advantageous features and advantages of the second splice trays 65 are now explained. The second splice tray 65 may have a rounded free or outer end 65 as illustrated. In addition, a fiber splice support area 67 may be provided adjacent the free end to hold one or more optical fiber splices as will be readily appreciated by those skilled in the art. The shape of the rounded outer end 68 corresponds to the adjacent interior wall portions of the housing 31 to thereby increase the compactness of the splice closure 25.

As shown in FIG. 6, one or more optical fiber loops 70 preferably extend from a first splice organizer tray 37 to a predetermined one of the second splice organizer trays to facilitate connecting to the fiber optic cable ring. The fiber loop 70 would typically be routed from a second tray 65 a first tray 37. The installer would then connect predetermined fibers from the main cable 26 (FIG. 1) to the ends of the loop 71 on the first tray 36. For the example explained above with reference to FIG. 1, forty-eight loops would be provided to permit fibers 1–48 to be available to be dropped by connection at the second splice trays 65. Accordingly, if fibers 1–4 were to be connected or dropped at a given drop location, for example, the drop splices would be stored on the respective second splice organizer tray 65. This relatively simple logic can be readily extended by those skilled in the art to configure a functioning network and with reduced cost and use of space, as well as greatly enhanced flexibility as compared to prior art approaches.

The second splice organizer trays 65 each preferably includes fiber guide means for guiding at least one optical fiber. In the illustrated embodiment, the second splice organizer tray 65 comprises the hinge pins 66 defining a hinge portion or end 71 opposite the free end portion 68 and pivotally connected to the mounting member 60. In the illustrated embodiment, the fiber guide means is provided by a horizontal base 77, vertically extending exterior sidewalls 72, interior sidewalls 73, and horizontally extending tabs 74. Paired horizontal tabs 75 define a slotted opening 76 therebetween that can be used to position the fibers under the tabs. Those of skill in the art will appreciate that other similar structures may be provided to guide the fibers so that their minimum bend radius is not violated.

The guide means also define respective first and second optical fiber ports 80, 81 on opposite sides of the hinge portion 71. As shown in FIG. 6, the guide means cooperate so that the loop 70 from a first splice tray 37 can be routed into and out of the port 80. Accordingly, organization of fibers is simplified as, for example, all of the fibers from the first trays 37 can be fed to a common side of the second trays 65. In addition, as will be explained below with reference to FIG. 7, the fibers to the drop cable can be arranged to enter from the opposite port 81 to also facilitate a tidy and efficient routing of fibers as will be readily appreciated by those skilled in the art.

Focusing now on the central portion of the second splice tray 65 as shown in FIG. 6, another significant feature of the invention is explained. In the illustrated embodiment, the fiber loop 70 is routed from the port 80 along the left sidewall 72, along the interior sidewall 73, along the right sidewall 72, along a portion of the bottom sidewall, and up and through the illustrated crossing guide member 85. The crossing guide member 85 includes four body portions 85a–85d that define crossing fiber channels through a central portion of the tray to permit the fibers to change rotational directions. The body portions 85a–85d define rounded outer surfaces for contacting the fibers routed thereover. Horizontally extending tabs 86 are also provided to help retain the fibers. Of course, each second splice organizer tray 65 can typically hold more than one fiber; however, for clarity of explanation only a single fiber loop 70 is shown in FIG. 6.

Turning now more particularly to FIG. 7, a second splice organizer tray 65 is shown after the loop fiber 70 has been cut, and a splice 88 has been made to a drop optical fiber 90. Of course, two such splices would typically be made to the two resulting ends of the loop fiber 70; however, only one is illustrated for clarity of explanation. The fiber 70 which is spliced to the main cable at a first splice organizer 37 extends through the left port 80, and the fiber 90 to the drop cable extends through the right port 81 in the illustrated embodiment. One slack loop for each fiber is also shown, although multiple such slack loops can be accommodated.

In a typical installation, such as in the network 20 of FIG. 1, forty-eight fibers of the 96-fiber cable 26 would be connected to loop fibers using the first splice trays 37 and second splice trays 65. To provide the flexibility to randomly in the future drop a fiber not in the original group of forty-eight, the invention advantageously, provides at least one third splice organizer tray. Such a tray preferably has the same configuration as the second splice trays 65 described in detail above. The third splice tray may be a designated one from the series as shown in FIG. 2, or may be positioned in spaced relation on the mounting member to more readily permit the technician to recognize its different function. The third splice organizer tray can permit splicing into any of the fibers in the cable, to thereby provide enhanced flexibility for reconfiguring the network 20 as will be readily appreciated by those skilled in the art.

A method aspect of the invention is for making a fiber optic cable network 20 of a type comprising a fiber optic cable 26 routed in a ring configuration and a plurality of drop locations along the fiber optic cable route. The method preferably comprises the steps of: providing a respective fiber optic splice closure 25 as described in detail above, at each of the drop locations; and splicing the at least one optical fiber from the ring to the at least one optical fiber at the at least one first splice organizer tray 37. The method may also include the of splicing at least one optical fiber from a drop cable 27 to the at least one optical fiber loop 70 on the at least one second splice organizer tray 65.

Each fiber optic splice closure 25 may further comprise a slack storage tray 50 connected to the base 32 and positioned in the housing 31 adjacent a side of the at least one first splice tray 37 opposite the mounting member 60. Accordingly, the method may further include the step of storing slack fiber passing through the splice closure 25 in the slack storage tray 50.

Another advantageous method feature of the invention permits connection to any of the fibers in the cable ring 26. More particularly, the method may include the steps of providing at least one third splice organizer tray on the mounting member 60, and connecting at least one predetermined optical fiber to the ring using the at least one third splice organizer tray.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A fiber optic splice closure comprising:
   a housing;
   a base connected to said housing;
   at least one first splice organizer tray having one end pivotally connected to said base and extending in a medial portion of said housing, said at least one first splice organizer tray comprising a fiber optic splice supporting portion;
   a slack storage tray connected to said base and positioned in said housing adjacent a first side of said at least one first splice tray;
   a mounting member pivotally connected to said base adjacent a second side of said at least one first splice organizer tray; and
   at least one second splice organizer tray pivotally connected to said mounting member on a side thereof opposite said at least one first splice organizer tray, said at least one second splice organizer tray comprising a fiber optic splice supporting portion.

2. A fiber optic splice closure according to claim 1 wherein said at least one first splice organizer tray is pivotal about a first axis; and wherein said at least one second splice organizer tray is pivotal about a second axis generally parallel to the first axis.

3. A fiber optic splice closure according to claim 2 wherein said housing has a generally cylindrical shape defining a longitudinal axis generally transverse to the first and second axes.

4. A fiber optic splice closure according to claim 2 wherein said mounting member is pivotal about an axis parallel to said first and second axes.

5. A fiber optic splice closure according to claim 1 wherein said at least one second splice organizer tray comprises a plurality of trays connected to said mounting member in side-by-side relation.

6. A fiber optic splice closure according to claim 1 further comprising at least one optical fiber extending from said at least one first splice organizer tray to said at least one second splice organizer tray.

7. A fiber optic splice closure according to claim 6 wherein said at least one optical fiber comprises a loop of optical fiber facilitating splicing to optical fibers for a drop location.

8. A fiber optic splice closure according to claim 6 further comprising at least one transport tube extending between said at least one first splice organizer tray and said at least one second splice organizer tray, and carrying said at least one optical fiber therein.

9. A fiber optic splice closure according to claim 1 wherein said at least one second splice organizer tray has a generally rounded free end portion opposite said mounting member.

10. A fiber optic splice closure according to claim 9 wherein said fiber optic splice supporting portion is adjacent the generally rounded free end portion of said at least one second splice organizer tray.

11. A fiber optic splice closure according to claim 10 wherein said at least one second splice organizer tray comprises fiber guide means for guiding at least one optical fiber thereon.

12. A fiber optic splice closure according to claim 11 wherein said at least one second splice organizer tray comprises a hinge portion opposite said free end portion and pivotally connected to said mounting member; and wherein said fiber guide means defines respective first and second optical fiber ports on opposite sides of said hinge portion.

13. A fiber optic splice closure according to claim 12 wherein said fiber guide means comprises a crossing guide member for guiding at least one optical fiber loop in a configuration to change rotational directions and thereby both enter and exit a predetermined port.

14. A fiber optic splice closure according to claim 1 further comprising at least one third splice organizer tray pivotally connected to said mounting member to facilitate splicing for random access to at least one optical fiber.

15. A fiber optic splice closure according to claim 14 wherein said at least one third splice organizer tray has a same configuration as said at least one second splice organizer tray.

16. A fiber optic splice closure according to claim 1 wherein said housing has a generally cylindrical shape; and wherein said base is connected to an end of said housing.

17. A fiber optic splice closure according to claim 16 wherein said at least one second splice organizer tray has a generally rounded free end portion opposite said mounting member to conform to adjacent portions of said generally cylindrical housing.

18. A fiber optic splice closure according to claim 16 wherein said at least one first splice organizer tray has a generally rectangular shape extending longitudinally in a medial portion of said generally cylindrical housing.

19. A fiber optic splice closure according to claim 16 wherein said slack storage tray has a generally rectangular shape and comprises generally sloping sidewalls to conform to adjacent portions of said generally cylindrical housing.

20. A fiber optic splice closure according to claim 1 further comprising a mounting bracket connected to said base for connecting said slack storage tray, said at least one first splice organizer tray, and said mounting member to said base.

21. A fiber optic splice closure according to claim 1 wherein said base comprises a plurality of cable ports therein for receiving respective fiber optic cables.

22. A fiber optic splice closure according to claim 1 wherein said at least one first splice organizer tray comprises fiber guide means for guiding at least one optical fiber thereon.

23. A fiber optic splice closure comprising:

a housing;

a base connected to said housing;

at least one first splice organizer tray having one end pivotally connected to said base and extending in said housing, said at least one first splice organizer tray comprising a fiber optic splice supporting portion;

a mounting member pivotally connected to said base adjacent said at least one first splice organizer tray;

a plurality of second splice organizer trays pivotally connected to said mounting member on a side thereof opposite said at least one first splice organizer tray, each of said second splice organizer trays comprising a fiber optic splice supporting portion; and at least one optical fiber extending from said at least one first splice organizer tray to at least one of said second splice organizer trays.

24. A fiber optic splice closure according to claim 23 further comprising a slack storage tray connected to said base and positioned in said housing adjacent a side of said at least one first splice tray opposite said mounting member.

25. A fiber optic splice closure according to claim 23 wherein said at least one first splice organizer tray is pivotal about a first axis; wherein said second splice organizer trays are pivotal about respective second axes generally parallel to the first axis.

26. A fiber optic splice closure according to claim 25 wherein said housing has a generally cylindrical shape defining a longitudinal axis generally transverse to the first and second axes.

27. A fiber optic splice closure according to claim 23 wherein said at least one optical fiber comprises a loop of optical fiber facilitating splicing to optical fibers for a drop location.

28. A fiber optic splice closure according to claim 23 further comprising at least one transport tube extending between said at least one first splice organizer tray and said at least one second splice organizer tray, and carrying said at least one optical fiber therein.

29. A fiber optic splice closure according to claim 23 wherein each of said second splice organizer trays has a generally rounded free end portion opposite said mounting member.

30. A fiber optic splice closure according to claim 29 wherein said fiber optic splice supporting portion is adjacent the generally rounded free end portion of each of said second splice organizer trays.

31. A fiber optic splice closure according to claim 30 wherein each of said second splice organizer trays comprises fiber guide means for guiding at least one optical fiber thereon.

32. A fiber optic splice closure according to claim 31 wherein each of said second splice organizer trays comprises a hinge portion opposite said free end portion and pivotally connected to said mounting member; and wherein said fiber guide means defines respective first and second optical fiber ports on opposite sides of said hinge portion.

33. A fiber optic splice closure according to claim 32 wherein said fiber guide means comprises a crossing guide member for guiding at least one optical fiber loop in a configuration to both enter and exit a predetermined port.

34. A fiber optic splice closure according to claim 23 further comprising at least one third splice organizer tray pivotally connected to said mounting member to facilitate splicing for random access to at least one optical fiber.

35. A fiber optic cable network comprising:

a fiber optic cable routed in a ring configuration;

a plurality of drop locations along the fiber optic cable route; and a respective fiber optic splice closure at the drop locations, each fiber optic splice closure comprising a housing, a base connected to said housing, at least one first splice organizer tray having one end pivotally connected to said base and extending in said housing, said at least one first splice organizer tray comprising a fiber optic splice supporting portion, a mounting member pivotally connected to said base adjacent said at least one first splice organizer tray, a plurality of second splice organizer trays pivotally connected to said mounting member on a side thereof opposite said at least one first splice organizer tray, each of said second splice organizer trays comprising a fiber optic splice supporting portion, and at least one optical fiber extending from said at least one first splice organizer tray to at least one of said second splice organizer trays.

36. A fiber optic cable network according to claim 35 further comprising a slack storage tray connected to said base and positioned in said housing adjacent a side of said at least one first splice tray opposite said mounting member.

37. A fiber optic cable network according to claim 35 wherein said at least one first splice organizer tray is pivotal about a first axis; wherein said second splice organizer trays are pivotal about respective second axes generally parallel to the first axis.

38. A fiber optic cable network according to claim 37 wherein said housing has a generally cylindrical shape defining a longitudinal axis generally transverse to the first and second axes.

39. A fiber optic cable network according to claim 35 wherein said at least one optical fiber comprises a loop of optical fiber facilitating splicing to optical fibers for a drop location.

40. A fiber optic cable network according to claim 35 further comprising at least one transport tube extending between said at least one first splice organizer tray and said at least one second splice organizer tray, and carrying said at least one optical fiber therein.

41. A fiber optic cable network according to claim 35 wherein each of said second splice organizer trays has a generally rounded free end portion opposite said mounting member.

42. A fiber optic cable network according to claim 41 wherein said fiber optic splice supporting portion is adjacent the generally rounded free end portion of each of said second splice organizer trays.

43. A fiber optic cable network according to claim 41 wherein each of said second splice organizer trays comprises fiber guide means for guiding at least one optical fiber thereon.

44. A fiber optic cable network according to claim 43 wherein each of said second splice organizer trays comprises a hinge portion opposite said free end portion and pivotally connected to said mounting member; and wherein said fiber guide means defines respective first and second optical fiber ports on opposite sides of said hinge portion.

45. A fiber optic cable network according to claim 44 wherein said fiber guide means comprises a crossing guide member for guiding at least one optical fiber loop in a configuration to both enter and exit a predetermined port.

46. A fiber optic cable network according to claim 35 further comprising at least one third splice organizer tray pivotally connected to said mounting member to facilitate splicing for random access to at least one optical fiber.

47. A method for making a fiber optic cable network of a type comprising a fiber optic cable routed in a ring configuration and a plurality of drop locations along the fiber optic cable; the method comprising the steps of:

providing a respective fiber optic splice closure at the drop locations, each fiber optic splice closure comprising a housing, a base connected to said housing, at least one first splice organizer tray having one end pivotally connected to said base and extending in said housing, a mounting member pivotally connected to said base adjacent said at least one first splice organizer tray, a plurality of second splice organizer trays pivotally connected to said mounting member on a side thereof opposite said at least one first splice organizer tray, and at least one optical fiber extending from said at least one first splice organizer tray to at least one of said second splice organizer trays; and splicing the at least one optical fiber from the ring to the at least one optical fiber and storing same on the at least one first splice organizer tray.

48. A method according to claim 47 further comprising the step of splicing at least one optical fiber from a drop cable to the at least one optical fiber and storing same on the at least one second splice organizer tray.

49. A method according to claim 47 wherein each fiber optic splice closure further comprises a slack storage tray connected to said base and positioned in said housing adjacent a side of said at least one first splice tray opposite said mounting member; and further comprising the step of storing slack fiber passing through the splice closure in the slack storage tray.

50. A method according to claim 47 further comprising the steps of:

providing at least one third splice organizer tray on said mounting member; and connecting at least one drop optical fiber to the ring using the at least one third splice organizer tray.

* * * * *